United States Patent

Segre

[15] 3,646,474
[45] Feb. 29, 1972

[54] SYMMETRICALLY PUMPED SLAB LASER

[72] Inventor: Joseph P. Segre, Acton, Mass.

[73] Assignee: American Optical Corporation, Southbridge, Mass.

[22] Filed: Apr. 21, 1969

[21] Appl. No.: 817,909

[52] U.S. Cl. ...................................................331/94.5
[51] Int. Cl. ..............................................H01s 3/00
[58] Field of Search...................................331/94.5

[56] References Cited

UNITED STATES PATENTS

| 3,308,395 | 3/1967 | Sorokin | 331/94.5 |
|---|---|---|---|
| 3,432,221 | 3/1967 | Harris et al. | 331/94.5 |
| 3,530,401 | 9/1970 | Garbuny et al. | 331/94.5 |
| 3,162,822 | 12/1964 | Tackaberry | 331/94.5 |
| 3,311,844 | 3/1967 | Di Curcio | 331/94.5 |
| 3,361,987 | 1/1968 | De Maria | 331/94.5 |
| 3,423,691 | 1/1969 | Chernoch et al. | 331/94.5 |
| 3,423,696 | 1/1969 | Chernoch | 331/94.5 |
| 3,426,194 | 2/1969 | Donne | 331/94.5 |
| 3,483,481 | 12/1969 | Church et al. | 331/94.5 |

OTHER PUBLICATIONS

Exfocal Pumping of Optical Masers in Elliptical Mirrors; D. Roess; Applied Optics; Feb. 1964, Vol. 3#2, pg. 259-265.
Temperature Field in Laser Active Elements in the Form of a Rod of Rectangular Section; Soviet Journal of Applied Spectroscopy; Nov. 1967, pp. 763-766 by Belostotskii et al.
"Solid State Lasers," A. A. Mak et al., Soviet Physics USPEKHI; Russian Vol. 92#3&4 Jan.-Feb. 1968, pg. 436 & 437

*Primary Examiner*—Ronald L. Wibert
*Assistant Examiner*—V. P. McGraw
*Attorney*—William C. Nealon, Noble S. Williams and Robert J. Bird

[57] ABSTRACT

The combination of apparatus for exfocal symmetrically pumping with a generally rectangular slab-type laser. The arrangement is especially suited to substantially overcome problems of birefringence induced by thermal gradients in a laser being pumped.

9 Claims, 10 Drawing Figures

PATENTED FEB 29 1972

INVENTOR.
JOSEPH P. SEGRE

BY William C. Nealon
ATTORNEY

INVENTOR.
JOSEPH P. SEGRE

BY
William C. Nealon
ATTORNEY

SYMMETRICALLY PUMPED SLAB LASER

BACKGROUND

Lasers, otherwise referred to as optical masers by some, are light-amplifying or light oscillation producing devices and are specifically adapted to provide an output of high-intensity coherent monochromatic light. Such light is produced in a laser by photonic emission from the active ions or atoms of a body composed of so-called laser material. The present invention is especially concerned with lasers of the glass type which are doped with certain rare earth oxides. A full background discussion of this type of laser may be found, for example, in copending U.S. application Ser. No. 168,012 of Elias Snitzer, filed Jan. 16, 1962 and owned by the same assignee as the instant application. The disclosure thereof is incorporated herein by reference.

A great amount of heat is generated within the body of a laser when operating it. For this reason some cooling scheme is essential. A common scheme calls for circulation of cooling fluid about the laser body. Another arrangement calls for slicing a laser rod into discs. The discs are then optically aligned along a common axis at spaced intervals, which axis is substantially colinear with the axis of propagation of the optical energy within the laser. The selected coolant, of a compatible index of refraction, is circulated between and circumferentially of the discs.

Even in the best of cooling arrangements one finds temperature gradients across the thickness (or diameter) of the pumped laser rod. These temperature gradients give rise to birefringence. Birefringence can cause depolarization of light passing or oscillating through the rod and is thus undesirable. A high degree of polarization is desirable since electro-optical modulators require plane-polarized light and such modulators are often utilized to accomplish Q-switching. The electro-optical modulator is very fast and capable of the much higher order of synchronization, which is necessary for Q-switching the present invention. This also results in shorter output pulses and allows more precise timing of each event. I have discovered and it is upon this that my invention is primarily predicated, that the problems of temperature gradient induced birefringence can be substantially eliminated by properly pumping a generally rectangular slablike laser rod.

OBJECT OF THE INVENTION

It is a primary object of the invention to provide a laser construction arranged to substantially eliminate the problems of temperature gradient induced birefringence.

THE DRAWINGS

DETAILED DISCLOSURE OF THE INVENTION

The purpose of this invention is to provide a laser configuration and construction which will allow one to reduce or more conveniently compensate for the effects of heating of laser material when it is operated at high repetition rates. As used herein "high repetition rates" is not used in terms of a given number of shots per minute but rather in terms of a rate of heat input from the pumping source such that, when a steady-state condition is reached, both the temperature and/or the temperature profile within the laser material differ enough from a single-shot condition to cause a change in the operating parameters of the laser. In materials with a low thermal conductivity and less favorable stress-optic and thermal expansion coefficients the repetition rate, for a given input per pulse in which the above condition is reached, is lower than for a material having more favorable parameters. This, in particular, is the case with glass with which this invention is concerned, as compared with crystalline laser materials. However, as noted hereafter, this invention does have applicability to crystalline laser materials.

According to this invention I use a slablike laser rod of rectangular cross section instead of the more usual circular cross section type rod. With this approach a desired cross-sectional area can be achieved while effective thickness of the laser rod is reduced thereby allowing much more efficient and effective cooling across the rod. For example, a 3-by-10-millimeter cross section slab has a cross-sectional area equivalent to a 6-millimeter diameter circular cross-sectioned rod. However, its reduced thickness (across the 3-millimeter dimension) allows much higher average power inputs for the same induced optical power and stresses or, conversely, lower stresses for the same average power input. For a high enough aspect ratio (over 3:1) of the cross section the end effects (i.e., the ends of the slab) can be neglected and one considers the thermal gradients as one-dimensional or planar in the slablike laser rod rather than two-dimensional or radial as in the circular cross-sectioned rod. By aspect ratio I mean $a/b$ wherein $a$ is the width of the slab and $b$ is the thickness. The aspect ratio for slabs according to this invention must be at least 2:1. Higher aspect ratios are more desirable, however, since one wishes the ends of the rod to approach linearity and thus an edge. For example, a square cross-section rod cannot be used since thermal gradients tend to round off and become circular towards the center thus not providing the substantially planar thermal gradients desired according to this invention. Having planar thermal gradients (or substantially planar ones) there is considerable advantage because much simpler and more easily operated thermal gradient compensation schemes can be used, as will be apparent hereafter.

Figure 8:
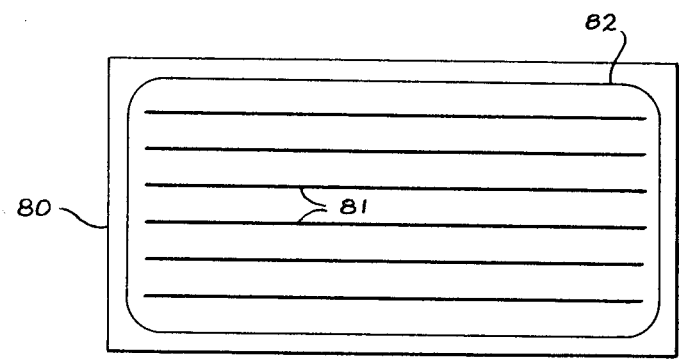
FIG. 8 is a schematic view of the isotherms one expects and achieves in a slab laser according to this invention.

More importantly, polarization schemes become much simpler since the thermal gradients are one-dimensional or planar. The induced axes of birefringence due to the thermal effects are in directions orthogonal to direction or axis of propagation of the laser energy, and are parallel to the rectangular sides as shown, for example, in FIG. 8 wherein the end of an exemplary slab 80 is shown to have a plurality of schematically induced parallel thermal gradients 81. Adjacent the edges as at 82 where nonlinearity is apparent, one can neglect this because laser action at the edge is generally less significant than closer to the center. Thus, all thermal gradients with which one must be concerned are planar and parallel to side faces and adapted to electro-optical polarizing modulation.

Figure 1:
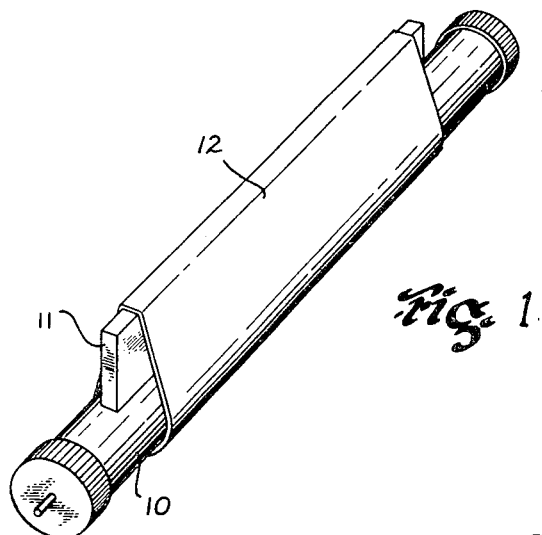
FIG. 1 is an isometric view of the simplest laser geometry according to this invention showing an elongated slablike laser rod and associated flashlamp.
Figure 2:
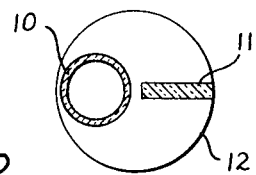
FIG. 2 is a schematic end view of the arrangement of FIG. 1.
Figure 7:
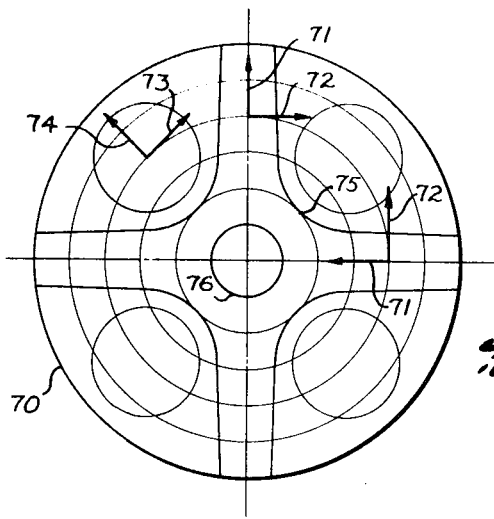
FIG. 7 is a schematic cross-sectional view of isotherms and polarization paths one expects in a laser rod of cylindrical cross section.

Since the induced axes of birefringence are plane and parallel to the sides, they are compatible with plane polarization constraints on The cavity oscillating modes. In contrast, the circular cross section, as shown, for example, in FIG. 7, which allows only radial and tangential polarization to remain unaltered in going through the rod and optical systems having only these polarizations are awkward to use. In FIG. 7 the schematic rod 70 is compatible with schemes which will polarize the radial and tangential light rays 71 and 72 respectively but not those light rays such as 73 and 74 which are oblique. Lines 75 and 76 are indicative of expected isotherms within a circular cross section rod which will induce such oblique light rays. With such a circular cross section rod the conventional laser Q-switching, for example, using a Glan polarizer and an electro-optical cell would not be possible here without severe loss of efficiency. Such systems can be used with my configuration. The simplest and most general case of a laser construction according to my invention is shown in FIGS. 1 and 2. The laser construction is comprised of a flashlamp 10, an elongated slablike laser rod 11, and a reflector 12. The slablike laser rod 11 is juxtaposed to the flashlamp 10 such that the axis of the flashlamp is generally parallel to the axis of propagation of laser energy through the slablike laser rod. Furthermore, a plane containing these two axes bisects both the flashlamp and the slablike laser rod, the plane passing through the rod normal to the minor side faces and parallel to the major side faces. About the slab and lamp is mounted a circular cross section cylindrical reflecting mirror 12 which may be such as silver or gold foil. Such an arrangement provides for exfocal pumping. The pumping is symmetrical and any warping of the slab due to pumping from one side only is avoided. Any warping due to the edge pumping is of second-order effect and can be avoided by masking.

Figure 3:
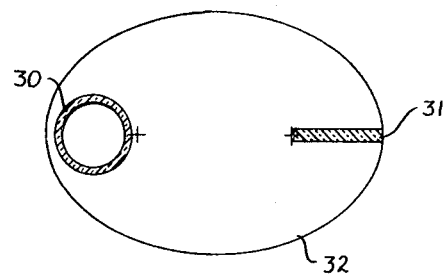
FIGS. 3, 4 and 5 are alternative pumping configurations providing exfocal pumping by using elliptical mirrors.

In FIG. 3 there is shown an alternative arrangement in which a flashlamp 30 and a rectangular slab 31 are arranged within an elliptical cross section cylinder 32. A plane passing through the two foci of the elliptical cross section will bisect the slab and the lamp along their respective lengths. The configuration of FIG. 3 is particularly convenient for water cooling which requires that the slab and lamp be separated. As can be seen, the cylindrical circular cross section configuration for the reflecting cylinder which is shown in FIG. 2 requires contiguous proximity between the flashlamp and longitudinal edge or surface of the slab 11. As is understood, however, both the systems of FIG. 2 and 3 are exfocal and imaging a light source into a plane thereby reducing the tendency to localize high inversions or hot spots in a portion of the slab.

Figure 4:
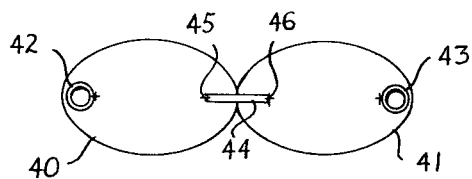
Figure 5:
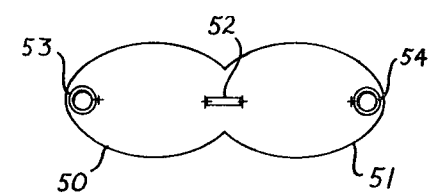

FIGS. 4 and 5 are variations on the arrangement of FIG. 3. In FIG. 4 there are two elliptical reflecting cylinders 40 and 41, two flashlamps 42 and 43, and a single slab 44. The two elliptical reflecting cylinders 40 and 41 abut or join along the center of the opposed longitudinal surfaces of the slab 44. The slab 44 is of sufficient width to extend between adjacent foci 45 and 46 of the two ellipses. As in FIG. 2 an outer surface of the respective lamps 42 and 43 is contiguous with respect to one of the foci of the two elliptical cross-sectioned reflecting cylinders. As in the case of FIG. 3 flashlamps, slab and all foci are bisected by a common plane. In FIG. 5 there is a pair of elliptically cross-sectioned intersecting reflecting cylinders 50 and 51. The points of intersection are mirror image spaced from respective opposed surfaces of the slab 52. There is a pair of flashlamps 53 and 54 and the lamps, the slab, and the foci of the two ellipses are all bisected by a common plane. The overlap is less than in a dual ellipse with line-to-line imaging where the ellipses are joined in the plane containing the focus and the loss and efficiency is therefor reduced. These configurations allow me to use a center slab, more flashlamps, and/or a combination of the two.

Figure 6:
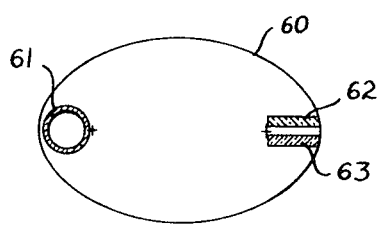
FIG. 6 is another embodiment of the invention wherein two slabs of laser material are utilized.

In the alternative arrangement of FIG. 6 there is shown an elliptical reflecting cylinder 60 having positioned therein a flashlamp 61 and a stacked pair of slabs 62 and 63. The lamp 61, the foci, and the space between the two slabs are bisected by a common plane. This configuration can be used to overcome a principal disadvantage of a slab, i.e., its higher transparency to pump radiation. Neither of the slabs is symmetrically pumped as in FIGS. 4 and 5, for example, but one easily can arrange for them to compensate for each other since thermal warping (and related conditions) is in opposite directions for the two, i.e., the slabs warp as mirror images and the effects thereof can be compensated for by the use of a prism over a common end.

In the case of a crystalline laser material having preferential gain for one polarization, the crystal axes should be oriented suitably. For example, a ruby slab should be cut so that the optic axis lies in a plane perpendicular to the long side of the cross section. The ordinary ray in the ruby has a polarization orientation across its width.

Another case exists which can be of interest: if the induced birefringence is low enough to have no effect on the laser efficiency for any arbitrary polarization, there can be advantages to having the plane of polarization at 45° to the slab sides. The conditions for low induced birefringence is met by a glass slab laser operating at very low repetition rates or by a ruby slab laser at all but the highest average power inputs, at which levels the gain, which in ruby is a function of temperature, would be low anyway.

The advantages would be in the ease of discrimination, if desired, against off-axis modes and intense fluorescence ray paths which depended on reflections from the sides of the slab for their path due to the change in the state of polarization that occurs upon total internal reflection (TIR) where the incident polarization vector is not parallel to the plane of the interface or lies in the plane formed by the ray path and its projection on the interface. In the case of a glass laser the external polarizer would discriminate while, in the ruby, the dichroism of the material itself would perform this function, aided by a polarizer, if desired. For TIR inside the slab the state of polarization is unaltered if the initial polarization is parallel or perpendicular to the sides of the rectangle. In a round cross section rod, there always exist modes, or ray paths, for which TIR without alteration of the state of polarization is possible. For this reason claddings and surface treatments, etc., are used.

Figure 9:
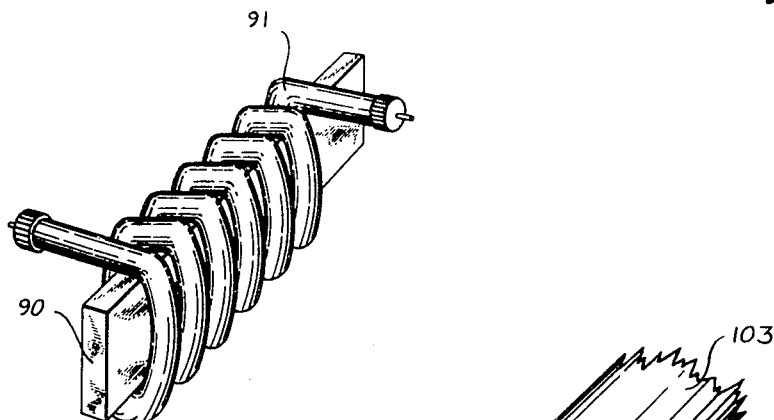
FIGS. 9 and 10 are alternatives laser systems using slab-type laser rods according to this invention.
Figure 10:
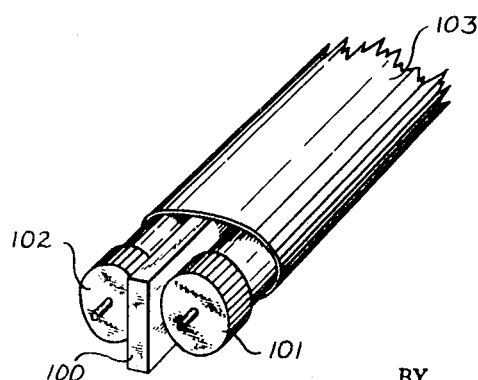

In FIGS. 9 and 10 there are shown nonimaging systems utilizing a slab laser having the essential aspect ratios identified above. In FIG. 9 there is shown a slab laser 90 associated with a helical flashlamp 91 which is contiguously shaped about it. In FIG. 10 there is shown a slab laser 100 and a pair of flashlamps 101 and 102 within a symmetrical, reflective cylinder 103. The flashlamps, slab laser, and reflector are all bisected by a common plane. The efficiency of the configurations of FIG. 9 and 10 is generally much lower than the other arrangements discussed above. For example, the efficiency is on the order of two to three times lower.

Having thus described the invention in detail and with sufficient particularity as to enable those skilled in the art to practice it, what is desired to have protected by Letters Patent is set forth in the following claims.

I claim:

1. The combination for use as a high repetition rate laser system comprising an elongated slablike laser rod, said slablike laser rod being elongated along an axis along which laser energy is propagated during operation of said system, said slablike laser rod being of generally rectangular cross section, and having an aspect ratio of width to thickness of greater than 2:1 with symmetrically oriented pumping means and reflecting devices therefor, the aspect ratio defining on the slablike laser rod a pair of major side faces and a pair of minor side faces, each of said faces being parallel to the axis of said slablike laser rod, and the induced thermal gradients in the slablike laser rod during laser operation being substantially parallel to the plane of the major surfaces of the slablike laser rod whereby one plane of polarization of said laser energy is parallel to the induced thermal gradients and the other plane is orthogonal thereto.

2. The arrangement of claim 1 in which the slablike laser rod has an aspect ratio of at least 3:1.

3. The arrangement of claim 1 in which the slablike laser rod and pumping means are longitudinally aligned along a common axis within a cylindrical reflector.

4. The arrangement of claim 3 in which said reflector is elliptical in cross section.

5. The arrangement of claim 3 in which said reflector comprises a pair of intersecting elliptical reflectors and in which said slablike laser rod spans the distance between adjacent foci of said two elliptical reflectors, said pair of reflectors, slablike laser rod, and pumping means all being bisected by a common plane.

6. The arrangement of claim 1 in which said pumping means comprises a helical light source wound about said slablike laser rod along the length thereof.

7. The arrangement of claim 1 in which said slablike laser rod is mounted across the width of a cylindrical reflector in a plane common with a bisector of said reflector, and there being a pair of symmetrically arranged pump sources within said reflector on either side of said slablike laser rod.

8. The arrangement of claim 1 in which said slablike laser rod is a rear earth oxide doped glass laser rod.

9. The arrangement of claim 1 in which said slablike laser rod is a ruby slab so cut that the optical axis thereof is in a plane perpendicular to the long side of the cross section thereof and in which the ordinary ray in the ruby has a polarization orientation across its width.

* * * * *